United States Patent
Dai

(10) Patent No.: US 12,518,394 B2
(45) Date of Patent: Jan. 6, 2026

(54) BIONIC VISION SENSOR, IMAGING METHOD AND UAV IMAGE TRANSMISSION SYSTEM

(71) Applicant: Shenzhen MetaSilicon Co., Ltd., Shenzhen (CN)

(72) Inventor: Zhu Dai, Shenzhen (CN)

(73) Assignee: Shenzhen MetaSilicon Co., Ltd., Shenzhen (CN)

( * ) Notice: Subject to any disclaimer, the term of this patent is extended or adjusted under 35 U.S.C. 154(b) by 285 days.

(21) Appl. No.: 18/327,768

(22) Filed: Jun. 1, 2023

(65) Prior Publication Data

US 2024/0127453 A1  Apr. 18, 2024

(30) Foreign Application Priority Data

Oct. 17, 2022  (CN) .......................... 202211266499.1

(51) Int. Cl.
*G06T 7/11* (2017.01)
*G06F 3/01* (2006.01)
(Continued)

(52) U.S. Cl.
CPC ................ *G06T 7/11* (2017.01); *G06F 3/013* (2013.01); *H04N 1/00095* (2013.01);
(Continued)

(58) Field of Classification Search
CPC ............. G06T 7/11; G06T 2207/20084; G06T 2207/20104; G06F 3/013; H04N 1/00095;
(Continued)

(56) References Cited

U.S. PATENT DOCUMENTS

2015/0049231 A1* 2/2015 Chen ...................... H04N 25/00
348/308
2016/0048964 A1* 2/2016 Kruglick ................ G06V 10/50
382/103
(Continued)

FOREIGN PATENT DOCUMENTS

CN  107153519 A1  9/2017
CN  109640007 A1  4/2019
(Continued)

*Primary Examiner* — Kathleen M Broughton
(74) *Attorney, Agent, or Firm* — Kolitch Romano Dascenzo Gates LLC

(57) ABSTRACT

A bionic vision sensor includes: a two-dimensional pixel array comprising a plurality of sensor pixels; a ROI module, wherein the ROI module is configured to obtain position information of at least one region of interest based on the two-dimensional pixel array; an image segmentation module, wherein the image segmentation module is configure to obtain at least one first region of the two-dimensional pixel array and at least one second region outside the first region according to the position information of region of interest; and a regional imaging control module, wherein the regional imaging control module is configured to generate a real-time image based on image data respectively obtained in the first region and the second region, and a pixel sampling rate of the first region is greater than a pixel sampling rate of the second region.

10 Claims, 12 Drawing Sheets

(51) Int. Cl.
*H04N 1/00* (2006.01)
*B64U 20/87* (2023.01)
*B64U 101/30* (2023.01)

(52) U.S. Cl.
CPC .......... *B64U 20/87* (2023.01); *B64U 2101/30* (2023.01); *G06T 2207/20084* (2013.01); *G06T 2207/20104* (2013.01)

(58) Field of Classification Search
CPC ...... H04N 1/64; B64U 20/87; B64U 2101/30; G06V 10/267; G06V 10/82
See application file for complete search history.

(56) References Cited

U.S. PATENT DOCUMENTS

| | | | |
|---|---|---|---|
| 2018/0173948 A1* | 6/2018 | Gousev | H04N 23/20 |
| 2019/0050664 A1* | 2/2019 | Yang | G06F 3/011 |
| 2020/0326775 A1* | 10/2020 | Koo | G06F 3/017 |
| 2021/0133452 A1* | 5/2021 | Berkovich | H04N 23/45 |

FOREIGN PATENT DOCUMENTS

| | | | | |
|---|---|---|---|---|
| CN | 111527741 A1 | 8/2020 | | |
| CN | 113242386 A1 | 8/2021 | | |
| KR | 20220059904 A | * | 5/2022 | ......... H04N 5/37455 |
| WO | 2013171738 A1 | 11/2013 | | |

* cited by examiner

BIONIC VISION SENSOR, IMAGING METHOD AND UAV IMAGE TRANSMISSION SYSTEM

CROSS-REFERENCE TO RELATED APPLICATIONS

This application is based upon and claims priority to Chinese Patent Application No. 202211266499.1, filed on Oct. 17, 2022, the entire contents of which are incorporated herein by reference.

TECHNICAL FIELD

The present disclosure relates generally to the field of photosensitive image sensors and more particularly to a bionic vision sensor, an imaging method and a UAV image transmission system.

BACKGROUND

Image resolution refers to how many pixels are arranged or displayed per inch of an image, and the unit of resolution is pixels per inch (PPI). Resolution determines the fineness of image detail. Generally, the higher the resolution of an image, the more pixels it contains and the clearer the image. However, high resolution will also increase the storage space of the file. For many vision-based applications, such as security monitoring, video conferencing, remote surgery, vision-based path planning and navigation, etc., real-time acquisition of high-frame-rate, high-quality images is critical. In the past twenty years, with the rapid development of CMOS technology, the resolution of image sensors has improved. Presently, sensors with hundreds of millions of pixels have appeared in the commercial market. On the one hand, high pixels effectively improve the image quality or video quality; on the other hand, the real-time transmission of high-resolution images puts forward extremely high requirements on the bandwidth and power consumption of the system.

An image sensor usually includes a two-dimensional pixel array. Current image sensor is designed to work in a row and column scan mode, usually including three image output modes:

In resolution mode, each pixel in the two-dimensional pixel array outputs valid data. The advantage of this mode is its high resolution; but the disadvantages are that the image is large, the data transmission time is long, and the frame rate is low.

In pixel binning mode, signals generated by adjacent pixels (usually 4 or 9 or 16 pixels) are combined into a signal output in the analog domain or in the digital domain. The advantage of this mode is that it can improve the signal-to-noise ratio of small-sized pixels in dark scene, reduce the volume of data, and increase the frame rate; but the disadvantage is that it will reduce the resolution.

In sample or pixel skipping mode, a certain proportion of pixels in the pixel array are extracted as output data. There are many extraction methods, which can be uniform distribution extraction, or interval row or interval column extraction. The advantage of this mode is that a high frame rate can be achieved, but the disadvantages are that the resolution is low, and image details are easily lost.

The human eyes obtain high-definition visual data mainly through the fovea region that occupies 1% of the entire visual field. Images outside the center of vision gradually blur (due to fewer cones). The peripheral visual field is mainly used to capture the movement and contrast information of objects, and the regions of interest (ROIs) is moved to the fovea for observation through eye movements. Take the wireless image transmission of unmanned aerial vehicles (UAVs), especially traversing aircraft (high-speed unmanned aerial vehicles), as an example, when flying at high speed, the communication quality will be reduced. If full-resolution high-definition images are transmitted, there will be extremely high demands on bandwidth and power consumption, and when the operator is operating the UAV, the ROI is mainly on the central region of the screen, and there is no need for high-resolution pixels in the peripheral region. The transmission of full resolution will also cause waste of information transmission. None of the above three modes can be optimally adapted to the usage scenario of UAV wireless image transmission.

The shortcomings of the image transmission technology in the prior art are as follows:
1. For applications requiring real-time monitoring, although the low-resolution image does not occupy the bandwidth, it seriously reduces the accuracy of the navigation operation.
2. However, if the full image with high resolution is transmitted all the time, bandwidth and power consumption will be greatly consumed, which is a dilemma.

Therefore, the present disclosure provides a bionic vision sensor, an imaging method and a UAV image transmission system.

SUMMARY

Aiming at the problems in the prior art, the present disclosure provides a bionic vision sensor, an imaging method and a UAV image transmission system, which overcomes the current technical hurdles, and can generate real-time images through partition sampling with adjustable resolution, retain the high resolution of ROI, reduce the resolution of the peripheral region, thereby improving the quality of image transmission and enhancing the safety of navigation operations without increasing bandwidth and power consumption.

The present disclosure provides a bionic vision sensor including:
- a two-dimensional pixel array including a plurality of sensor pixels;
- a ROI module, which obtains position information of at least one region of interest based on the two-dimensional pixel array;
- an image segmentation module, which obtains at least one first region of the two-dimensional pixel array and at least one second region outside of the first region according to the position information of region of interest; and
- a regional imaging control module, which generates a real-time image based on image data respectively obtained in the first region and the second region, and a pixel sampling rate of the first region is greater than a pixel sampling rate of the second region.

In some embodiments of the present disclosure, the ROI module includes a prediction neural network module, and a real-time image is input into the prediction neural network module to obtain position information of at least one region of interest.

In some embodiments of the present disclosure, the prediction neural network module obtains object information by segmenting and recognizing real-time images, and according to a preset object recommendation sequence, establishes position information of one region of interest in a center of a partial image corresponding to the object information with a highest recommendation.

In some embodiments of the present disclosure, wherein the two-dimensional pixel array obtains a preliminary image at a pixel sampling rate of a preset resolution for each frame, and inputs the preliminary image into a prediction neural network module to obtain position information of at least one region of interest in a current frame;

the regional imaging control module generates a real-time image based on image data respectively obtained in the first region and in the second region, the first region is imaged at a highest resolution, and the second region is imaged at a reduced pixel sampling rate.

In some embodiments of the present disclosure, the two-dimensional pixel array obtains a preliminary image at a pixel sampling rate of a lowest resolution for each frame, and inputs the preliminary image into a prediction neural network module to obtain position information of at least one region of interest in a current frame;

the regional imaging control module generates a real-time image based on image data respectively obtained in the first region and in the second region, the first region is imaged at a highest resolution, and the second region is imaged at a reduced pixel sampling rate.

In some embodiments of the present disclosure, wherein a real-time image of a current frame is input into the prediction neural network module to obtain position information of one region of interest of a next frame.

In some embodiments of the present disclosure, the bionic vision sensor further includes a sampling array;

the regional imaging control module selects a first sensor pixel group from the first region according to a first resolution, selects a second sensor pixel group from the second region according to a second resolution, and the first resolution is higher than the second resolution;

the sampling array generates an image according to the image data of a target scene collected by the first sensor pixel group and the second sensor pixel group.

In some embodiments of the present disclosure, the sampling array includes a plurality of transmission channels that are capable of connecting or disconnecting to each sensor pixel respectively;

the sampling array updates a status of the transmission channels in a first sampling sub-array in a first region according to the first resolution, a number of transmission channels enabled in the first sampling sub-array meets the first resolution;

the sampling array updates a status of the transmission channels in a second sampling sub-array in a second region according to the second resolution, a number of transmission channels enabled in the second sampling sub-array meets the second resolution.

In some embodiments of the present disclosure, the ROI module receives position information of a region of interest of a user's eyeballs on the two-dimensional pixel array generated by an eye tracking device.

The present disclosure also provides a bionic vision imaging method including steps of:

obtaining position information of at least one region of interest based on a two-dimensional pixel array;

obtaining at least a first region of the two-dimensional pixel array and at least a second region outside of the first region according to the position information of at least one region of interest; and generating a real-time image according to image data obtained respectively from the first region and the second region, and a pixel sampling rate of the first region is greater than a pixel sampling rate of the second region.

The present disclosure further provides a UAV image transmission system including:

a bionic vision sensor arranged on a UAV, used to sample images by partition according to position information of regions of interest and generate real-time images, wherein a resolution of an image region around the position information of region of interest in the real-time image is greater than a resolution of other image region; and a display component, used to receive and display the real-time image, track ROIs of a user's eyeballs on the two-dimensional pixel array of the bionic vision sensor and generate position information of region of interest.

In some embodiments of the present disclosure, the bionic vision sensor includes:

a two-dimensional pixel array including a plurality of sensor pixels; a first communication module, used to receive the position information of region of interest and send a real-time image;

an image segmentation module, which obtains at least one first region of the two-dimensional pixel array and at least one second region outside of the first region according to the position information of region of interest; and a regional imaging control module, which generates a real-time image according to image data obtained respectively from the first region and the second region, and a pixel sampling rate of the first region is greater than a pixel sampling rate of the second region.

In some embodiments of the present disclosure, the UAV image transmission system further includes a sampling array;

the regional imaging control module selects a first sensor pixel group from the first region according to a first resolution, selects a second sensor pixel group from the second region according to a second resolution, and the first resolution is higher than the second resolution;

the sampling array generates an image according to the image data of a target scene collected by the first sensor pixel group and the second sensor pixel group.

In some embodiments of the present disclosure, the sampling array includes a plurality of transmission channels that are capable of connecting or disconnecting to each sensor pixel respectively;

the sampling array updates a status of the transmission channels in a first sampling sub-array in a first region according to the first resolution, a number of transmission channels enabled in the first sampling sub-array meets the first resolution;

the sampling array updates a status of the transmission channels in a second sampling sub-array in a second region according to the second resolution, a number of transmission channels enabled in the second sampling sub-array meets the second resolution.

In some embodiments of the present disclosure, the display component includes: a second communication module, used to receive the real-time image and send the position information of the region of interest;

a display device for displaying the real-time image; and an eyeball tracking device, used to track ROIs of a user's eyeballs on the two-dimensional pixel array of the bionic vision sensor and generate position information of region of interest.

In some embodiments of the present disclosure, the display component is set on one of the following devices:
- a smart helmet with eye-tracking capabilities;
- a smart glasses with eye-tracking capabilities;
- a mobile phone with eye tracking function; or
- a display with eye-tracking capabilities.

The purpose of the present disclosure is to provide a bionic vision sensor, an imaging method and a UAV image transmission system, which can generate real-time picture by the partition sampling of adjustable resolution, retain the high resolution of ROIs and reduce resolution of peripheral region. Therefore, without increasing bandwidth and power consumption, the quality of image transmission is improved, and the safety of navigation operations is enhanced.

BRIEF DESCRIPTION OF THE DRAWINGS

In order to more clearly illustrate technical solutions in the embodiments of the present disclosure, the drawings used in the description of the embodiments are briefly described below. Obviously, the drawings in the following description are merely some embodiments of the present disclosure. Those skilled in the art can also obtain other drawings based on these drawings without any creative labor.

DETAILED DESCRIPTION

To better illustrate the purpose of the present disclosure, technical proposal and advantages thereof, embodiments of the present disclosure will be described in detail with reference to the drawings. It should be readily understood that both the embodiments and the drawings are explanatory for the present disclosure only, and are not intended as a limitation on the scope of the present disclosure.

Figure 1:
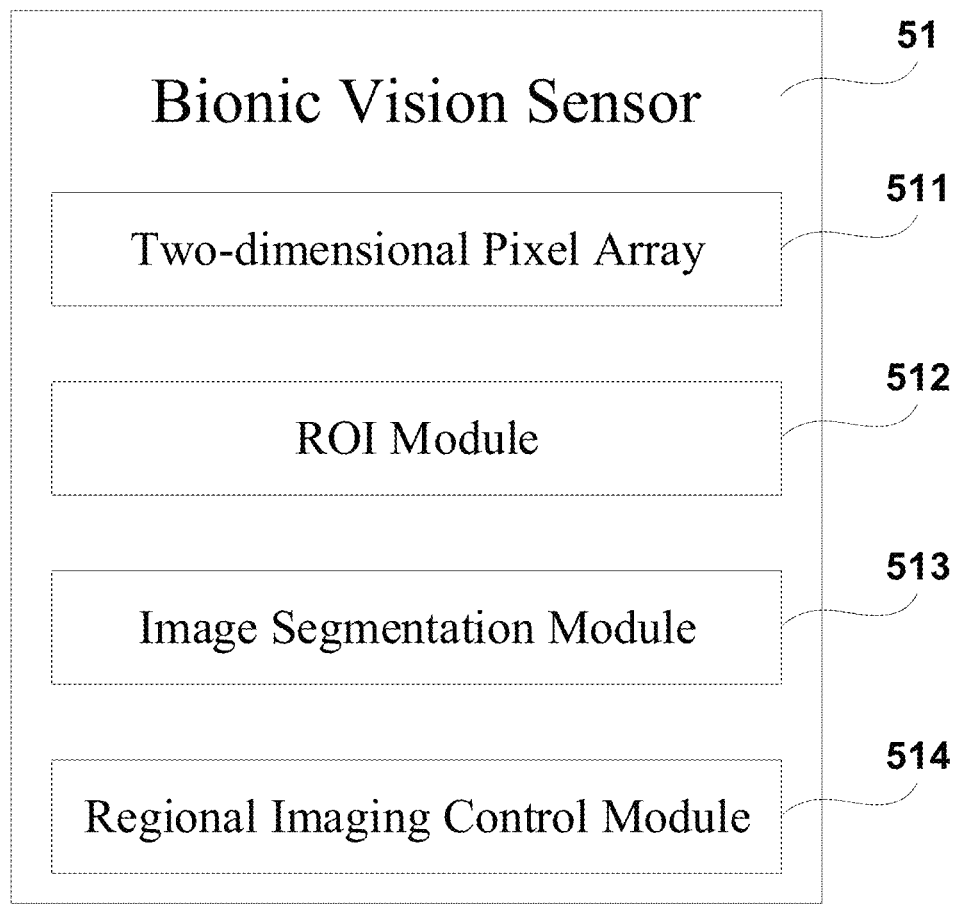
FIG. 1 is a module diagram of a bionic vision sensor according to an embodiment of the present disclosure.

FIG. 1 is a module diagram of a bionic vision sensor according to an embodiment of the present disclosure. The vision sensor 51 includes a two-dimensional pixel array 511, a ROI module 512, an image segmentation module 513 and a regional imaging control module 514. The two-dimensional pixel array 511 includes a plurality of sensor pixels. The ROI module 512 obtains position information of at least one region of interest based on the two-dimensional pixel array 511. The image segmentation module 513 obtains at least one first region of the two-dimensional pixel array 511 and at least one second region outside of the first region according to the position information of regions of interest. And the regional imaging control module 514 generates a real-time image based on image data respectively obtained in the first region and the second region, and a pixel sampling rate of the first region is greater than a pixel sampling rate of the second region. The present disclosure provides an intelligent bionic vision sensor, which adopts the image acquisition mode that conforms to the visual characteristics of human eyes (only the region of interest is clear, while the periphery is blurred), and at the same time, the bionic vision sensor takes into account the high resolution of ROI as well as the overall power consumption and frame rate.

In some examples, the ROI module 512 includes a prediction neural network module, and a real-time image is input into the prediction neural network module to obtain position information of at least one region of interest. In this way, it is possible to automatically track points of interest based on the visual AI neural network module and generate images with uneven resolution.

In some examples, the prediction neural network module obtains object information by segmenting and recognizing real-time images, and according to a preset object recommendation sequence, establishes position information of one region of interest in a center of a partial image corresponding to the object information with a highest recommendation. For example, in an application scenario for traffic, the high-resolution local region acquisition of identified oncoming vehicles or pedestrians will be prioritized. When there are oncoming vehicles in the first region and pedestrians in the other region, these two regions can be separately collected with high resolution, so that the subsequent neural network module can identify the objects in these two parts more accurately, and navigation security will be improved, but not limited to.

In some examples, the two-dimensional pixel array obtains a preliminary image at a pixel sampling rate of a preset resolution for each frame, and inputs the preliminary image into a prediction neural network module to obtain position information of at least one region of interest in a current frame. Then the regional imaging control module generates a real-time image based on image data respectively obtained in the first region and in the second region, the first region is imaged at a highest resolution, and the second region is imaged at a reduced pixel sampling rate, but not limited thereto.

In some examples, the two-dimensional pixel array obtains a preliminary image at a pixel sampling rate of a lowest resolution for each frame, and inputs the preliminary image into a prediction neural network module to obtain position information of at least one region of interest in a current frame. Then the regional imaging control module generates a real-time image based on image data respectively obtained in the first region and in the second region, the first region is imaged at a highest resolution, and the second region is imaged at a reduced pixel sampling rate, but not limited thereto.

In some examples, the two-dimensional pixel array 511 further includes a sampling array. The regional imaging control module 514 selects a first sensor pixel group from the first region according to a first resolution, selects a second sensor pixel group from the second region according to a second resolution, and the first resolution is higher than the second resolution; the sampling array generates an image according to the image data of a target scene collected by the first sensor pixel group and the second sensor pixel group.

In some examples, the sampling array includes a plurality of transmission channels that are capable of connecting or disconnecting to each sensor pixel respectively. The sampling array updates a status of the transmission channels in a first sampling sub-array in a first region according to the first resolution, and makes a number of transmission channels in the first sampling sub-array meet the requirement of the first resolution. The sampling array updates a status of the transmission channels in a second sampling sub-array in a second region according to the second resolution, and makes a number of transmission channels in the second sampling sub-array meet the requirement of second resolution, but not limited thereto.

In some examples, the ROI module receives position information of a region of interest of a user's eyeballs on the two-dimensional pixel array generated by an eye tracking device, but not limited thereto. The eye tracking device in this embodiment may be a device such as an eye tracker (for example, Tobii eye tracker, etc.). The structure of an existing eye tracker generally includes four systems, namely the optical system, the pupil center coordinate extraction system, the view and pupil coordinate superposition system, and the image and data recording and analysis system, but not limited thereto.

In some examples, in order to avoid the bilinear image, with the region of interest as the center, a circle and multiple concentric rings surrounding the circle can be generated through the image segmentation module, and the mapping relationship between the circle and the pixels within each concentric ring can be established. Finally, the regional imaging control module will image the concentric rings closer to the region of interest with higher resolution; and image the concentric rings farther away from the region of interest with lower resolution. In this way, it is closer to the visual effect in natural conditions, and the user is prevented from feeling dizzy due to the unreal vision.

In some examples, the present disclosure can be applied to smart wearable devices of AR/VR/MR, and the smart wearable devices may be smart glasses or smart helmets, but not limited thereto. The smart wearable device is set with an eye tracking device and the image sensor of the present disclosure, the imaging resolution of each region of the two-dimensional pixel array can be adjusted by tracking the ROI of the user's eyeball on the two-dimensional pixel array of the image sensor in real time. For example, a first imaging is performed with high resolution for the ROI of the user's eyeballs, and a second imaging is performed with low resolution for other region, and the combined image of the first imaging and the second imaging is displayed in real time.

Figure 2:
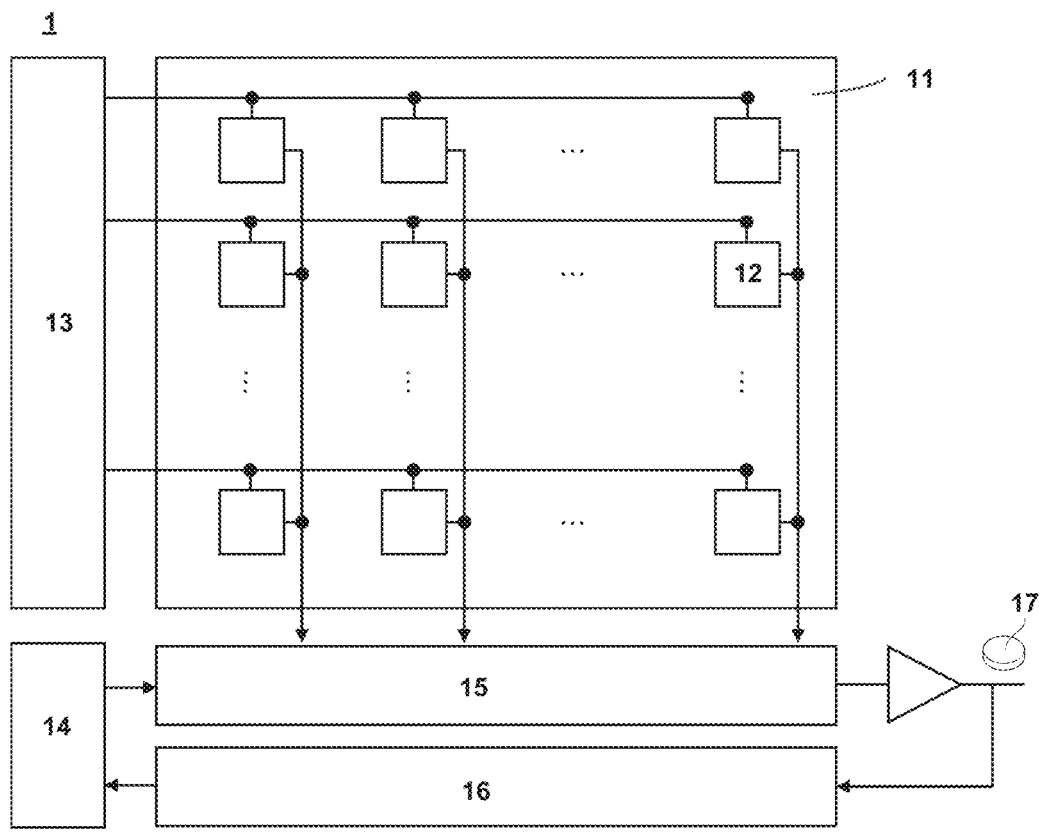
FIG. 2 is a circuit module diagram of a bionic vision sensor in operating according to an embodiment of the present disclosure.
Figure 3:
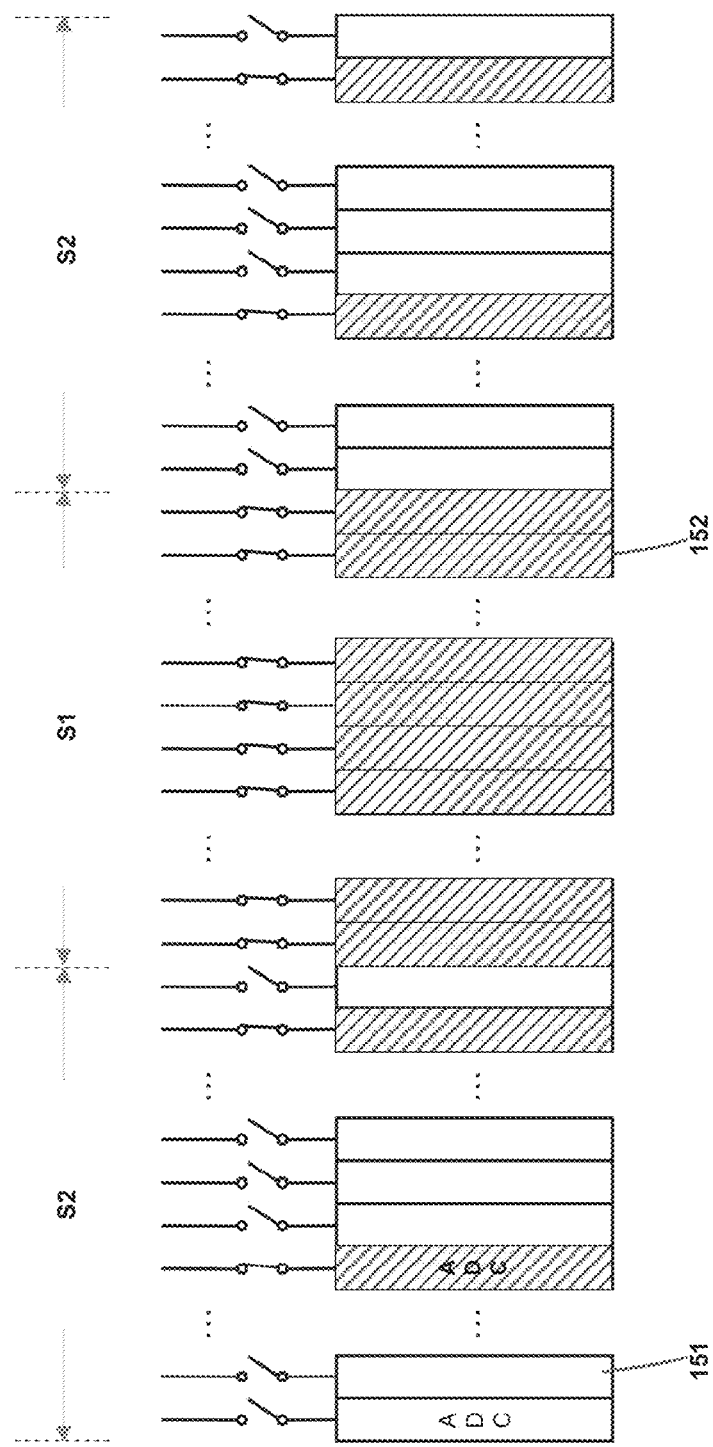
FIG. 3 is a schematic diagram of working principle of a sampling array according to an embodiment of the present disclosure.

FIG. 2 is a circuit module diagram of a bionic vision sensor in operating, and FIG. 3 is a schematic diagram of working principle of a sampling array according to an embodiment of the present disclosure. As shown in FIG. 2 and FIG. 3, the circuit modules of the image sensor 1 includes: a pixel array 11, a row control circuit 13, a system control unit 14, an analog-to-digital converter (ADC) array 15 and an ROI determination unit 16.

The pixel array 11 includes a plurality of sensor pixels 12. The pixels 121 are arranged in a two-dimensional row-column distribution in the pixel array 11. Each sensor pixel 12 is configured to complete photoelectric conversion in time sequence, and output an electrical signal to an analog-to-digital converter (ADC) in the corresponding column.

The ROI determination unit 16 is configured to determine the ROI according to the received image data, and dynamically adjust and output the corresponding control signal. The ROI determination unit 16 obtains position information of at least one region of interest based on the pixel array 11.

The system control unit 14 is configured to control on or off of a certain ADC in the ADC array 15. The system control unit 14 obtains at least one first region and at least one second region outside of the first region in the pixel array 11 according to position information of at least one region of interest.

The ADC array 15 is configured to receive the analog signal of a certain pixel in the corresponding column, and the analog signal is used for completing the exposure sequence by the row control circuit. The ADC array 15 is also configured to convert the analog signal into a digital signal for output. The ADC array 15 generates a real-time image 17 based on image data respectively obtained in the first region and in the second region, and the pixel sampling rate of the first region is greater than that of the second region. Compared with the traditional ADC array, each ADC of the ADC array in the present disclosure is added with a switch, and each ADC can be individually controlled to be on or off. The switches are controlled by the above-mentioned system control unit 14. All ADCs in the ROI region are working normally. In the non-ROI region, the ADC is activated intermittently to skip readout of the image. The structure of the ROI determination unit can be composed of a neural network circuit or a dedicated integrated circuit, which can be adjusted according to actual application requirements. In addition, the ROI determination unit can be a working module integrated with the sensor chip, or an independent chip. For example, in the applications for single-type of image recognition (such as continuous recognition of license plates and pedestrians in smart city traffic management), since only specific images need to be recognized and the image features are similar, the calculation volume of ROI determination unit is small. Therefore, ROI determination unit can be a small neural network module integrated with the sensor chip. In addition, for applications such as virtual reality, augmented reality, and mixed reality, the ROI determination unit can be combined with the eye tracking module, which is used to track the position information where the human eyes focus on in real time. The ROI determination unit divides the pixel array into a full-resolution region and a sampling region according to image data combined with position information. The system control unit sends a control signal to control the corresponding ADC to be turned off or on. For example, one application is to use smart glasses to watch the flying perspective images collected by UAVs.

The ROI determination unit 16 determines the ROI according to the received image data, and dynamically adjusts the corresponding output control signal. The ROI determination unit 16 includes a prediction neural network module. Position information of at least one region of interest is obtained after inputting real-time images into the prediction neural network module. The prediction neural network module obtains object information by segmenting and recognizing real-time images, and then according to a preset object recommendation sequence, establishes position information of one region of interest in a center of a partial image corresponding to the object information with a highest recommendation.

The two-dimensional pixel array 11 obtains a preliminary image at a pixel sampling rate of a preset resolution for each frame, and inputs the preliminary image into a prediction neural network module to obtain position information of at least one region of interest in a current frame.

The regional imaging control module generates a real-time image based on image data respectively obtained in the first region and in the second region, the first region is imaged at a highest resolution, and the second region is imaged at a reduced pixel sampling rate.

The ADC array 15 generates a real-time image based on image data respectively obtained in the first region and in the second region, the first region is imaged at a highest resolution, and the second region is imaged at a reduced pixel sampling rate. According to the control information of the system control unit 14, the ADC array 15 selects a first sensor pixel group from the first region according to a first resolution, selects a second sensor pixel group from the second region according to a second resolution, and the first resolution is higher than the second resolution; and the sampling array generates an image based on the image data of a target scene captured by the first sensor pixel group and the second sensor pixel group. The ADC array 15 includes a plurality of transmission channels that are capable of connecting or disconnecting to each sensor pixel respectively. The sampling array updates a status of the transmission channels in a first sampling sub-array in a first region according to the first resolution, that is, updates a transmission channel to a closed transmission channel 151 or an open transmission channel 152. The number of open transmission channels 152 in the first sampling sub-array (S1) needs to meet the first resolution. The sampling array updates a status of the transmission channels in a second sampling sub-array (S2) in a second region according to the second resolution, so that the number of open transmission channels 152 in the second sampling sub-array meets the second resolution.

Compared with the traditional image sensor, the vision sensor of the present disclosure is additionally provided with an improved ADC array and ROI determination module. By improving the structure of the ADC array, that is, adding a switch unit to each column of ADCs, controllable sub-region full-resolution output or skip readout mode is realized. Moreover, the ROI determination unit divides the ROI region and the sampling region according to the image features, and/or, the eye tracking data.

The image sensor of the present disclosure conforms to the visual characteristics of human eyes. The image sensor acquires and outputs a full-resolution image of a region of interest (ROI), and the peripheral region is sampled with a low resolution. The image sensor can realize high-resolution acquisition and output of ROI regions of the image, compress the overall data volume, increase the frame rate, and reduce power consumption.

Figure 4:
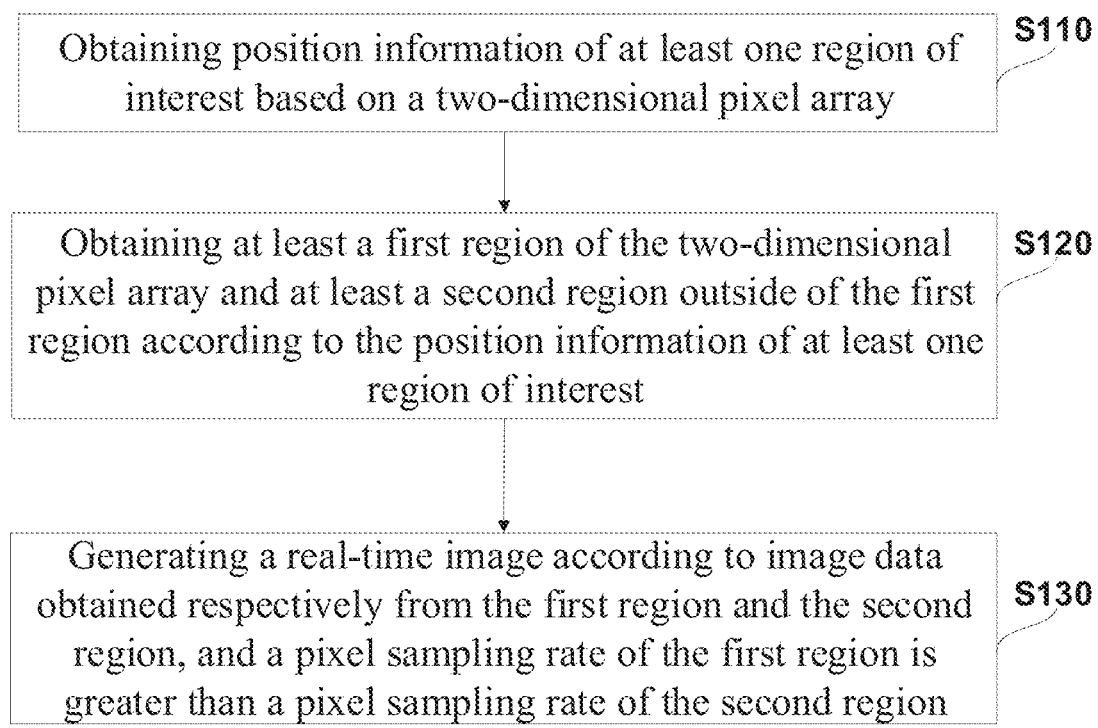
FIG. 4 is a flowchart of a bionic vision imaging method according to an embodiment of the present disclosure.

FIG. 4 is a flowchart of a bionic vision imaging method according to an embodiment of the present disclosure. The bionic vision imaging method including the following steps:

S110: obtaining position information of at least one region of interest based on a two-dimensional pixel array;

S120: obtaining at least a first region of the two-dimensional pixel array and at least a second region outside of the first region according to the position information of at least one region of interest;

S130: generating a real-time image according to image data obtained respectively from the first region and the second region, and a pixel sampling rate of the first region is greater than a pixel sampling rate of the second region.

FIG. 5, FIG. 6, FIG. 7, FIG. 8 and FIG. 9 are schematic diagrams in a serial steps of a bionic vision imaging method according to an embodiment of the present disclosure.

Figure 5:
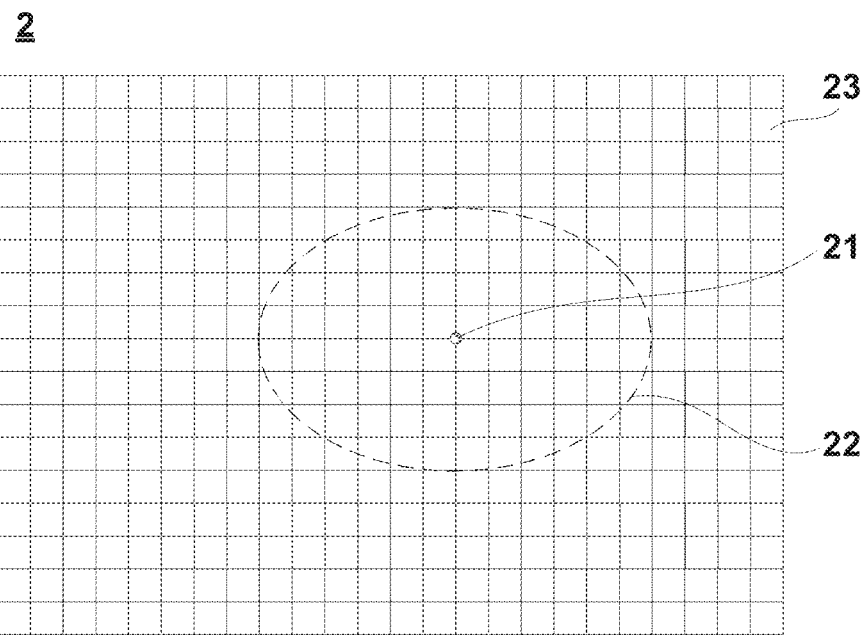
FIG. 5, FIG. 6, FIG. 7, FIG. 8 and FIG. 9 are schematic diagrams in a serial steps of a bionic vision imaging method according to an embodiment of the present disclosure.
Figure 6:
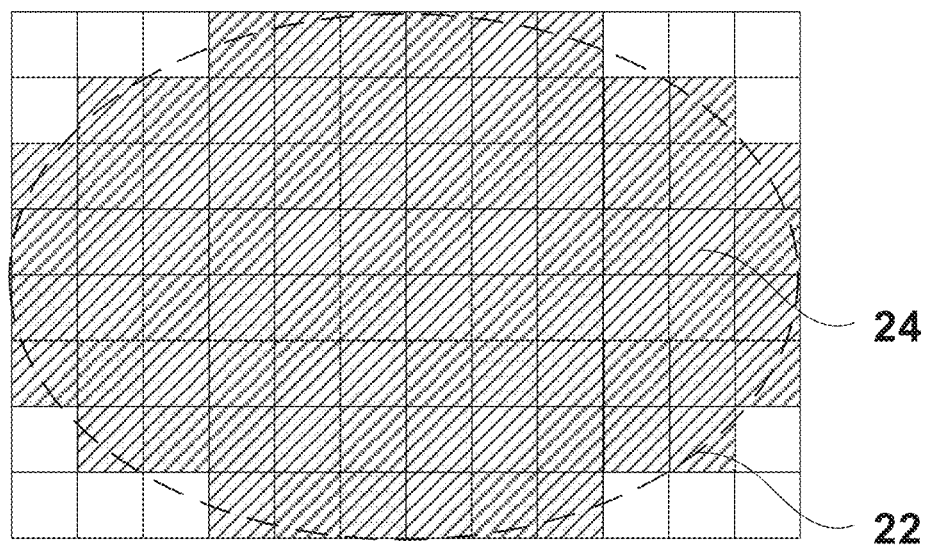

As shown in FIG. 5, firstly, two-dimensional pixel array 2 obtains a preliminary image at a pixel sampling rate of a preset resolution for each frame, and inputs the preliminary image into a prediction neural network module to obtain position information 21 of at least one region of interest in a current frame;

As shown in FIG. 6, at least one first region 22 of the two-dimensional pixel array and the pixel sensor 24 in the first region 22 are obtained according to position information of region of interest.

Figure 7:
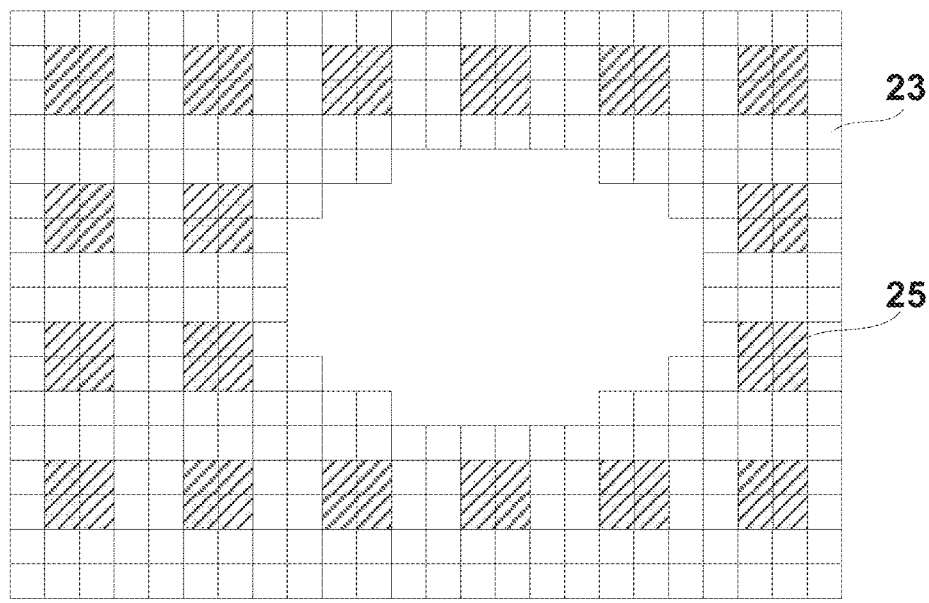

As shown in FIG. 7, the second region 23 and the pixel sensors 25 in the second region 23 are obtained according to the regions outside the first region 22.

Figure 8:
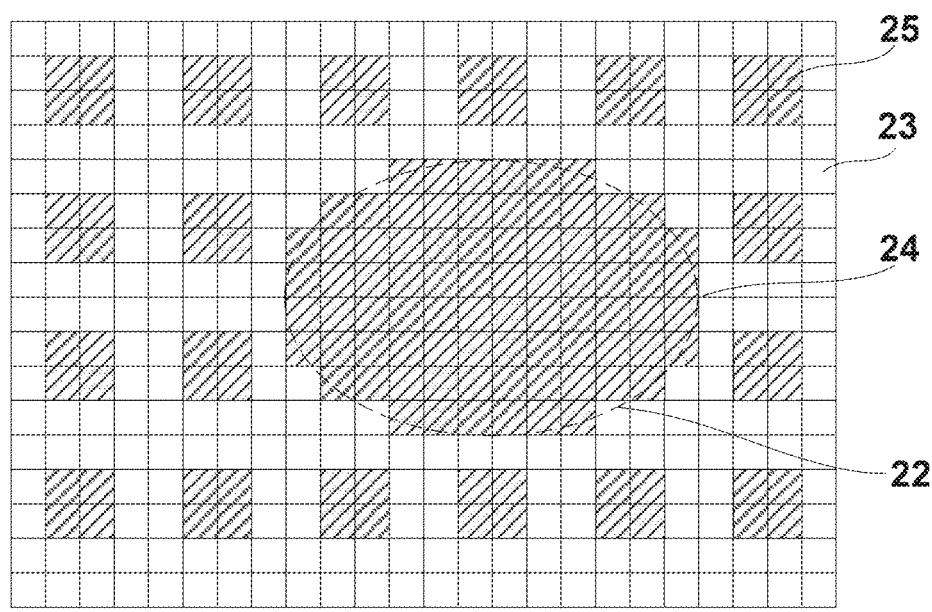

As shown in FIG. 8, a real-time image is generated based on the image data obtained respectively in the first region 22 and the second region 23. The image information of each pixel sensor 24 in the first region 22 is acquired to obtain a regional image of the corresponding region with the highest resolution. The second region 23 is imaged at a reduced pixel sampling rate, that is, based on low pixel sampling rate, the image information of part of pixel sensors 24 in the first region 22 is acquired to obtain a regional image of the corresponding region with low resolution.

Figure 9:
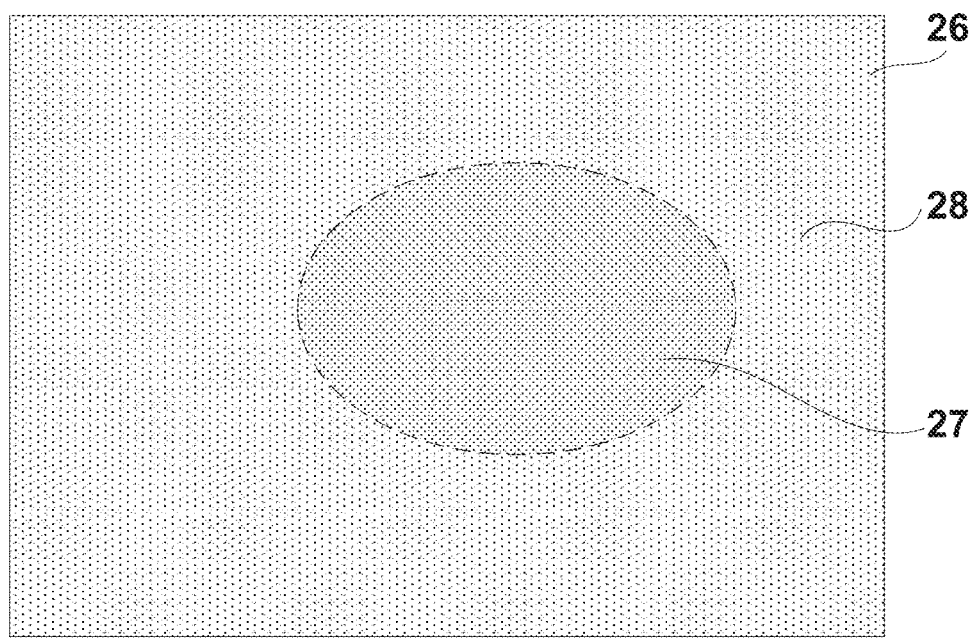

As shown in FIG. 9, the real-time image 26 with non-uniform resolution is finally obtained by combining the regional images of the first region 22 and the second region 23. The peripheral region 27 of the center of the region of interest in the real-time image is in the highest resolution, and the other regions 28 are in low resolution, but not limited thereto.

Figure 10:
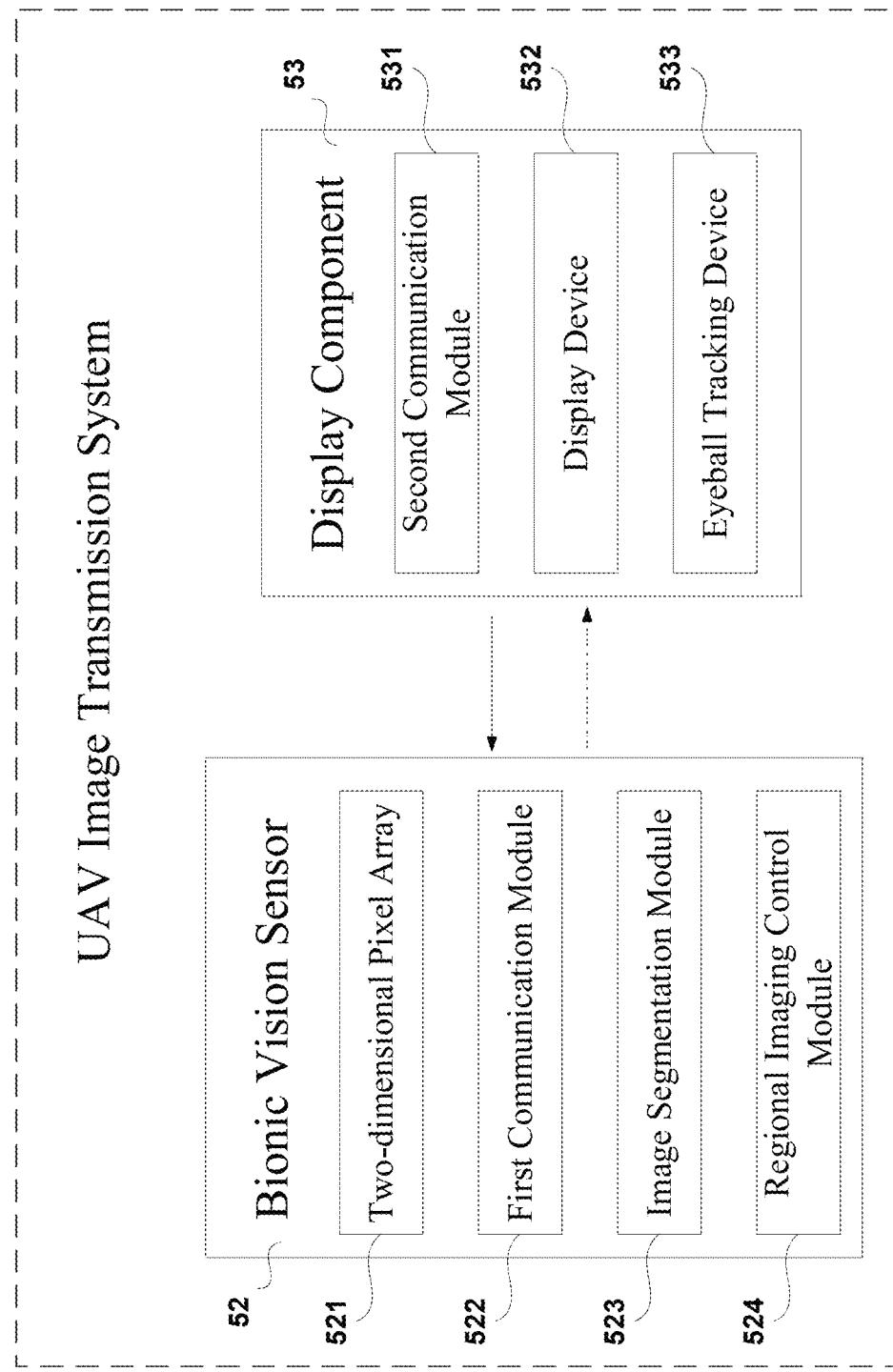
FIG. 10 is a module diagram of a UAV image transmission system according to an embodiment of the present disclosure.

FIG. 10 is a module diagram of a UAV image transmission system according to an embodiment of the present disclosure. The UAV image transmission system includes a bionic vision sensor 52 and a display component 53. The bionic vision sensor 52 is arranged on a UAV, and it is used to sample images by partition according to position information of regions of interest and generate real-time images, wherein a resolution of an image region around the position information of region of interest in the real-time image is greater than a resolution of other image region. The display component 53 is used to receive and display the real-time image, track ROI of a user's eyeballs on the two-dimensional pixel array of the bionic vision sensor and generate position information of region of interest, but not limited thereto.

In some examples, the bionic vision sensor 52 comprises:
a two-dimensional pixel array 521 including a plurality of sensor pixels;
a first communication module 522 configured to receive the position information of points of interest and send a real-time image;
an image segmentation module 523 configured to obtain at least one first region of the two-dimensional pixel array 521 and at least one second region outside the first region according to the position information of region of interest; and
a regional imaging control module 524 configured to generate a real-time image according to image data obtained respectively from the first region and the second region, and a pixel sampling rate of the first region is greater than a pixel sampling rate of the second region, but not limited thereto.

In some examples, the UAV image transmission system further includes a sampling array;
the regional imaging control module 524 selects a first sensor pixel group from the first region according to a first resolution, selects a second sensor pixel group from the second region according to a second resolution, and the first resolution is higher than the second resolution;

the sampling array generates an image according to the image data of a target scene collected by the first sensor pixel group and the second sensor pixel group, but not limited thereto.

In some examples, the sampling array includes a plurality of transmission channels that are capable of connecting or disconnecting to each sensor pixel respectively;

the sampling array updates a status of the transmission channels in a first sampling sub-array in a first region according to the first resolution, and makes a number of transmission channels in the first sampling sub-array meet the first resolution;

the sampling array updates a status of the transmission channels in a second sampling sub-array in a second region according to the second resolution, and makes a number of transmission channels in the second sampling sub-array meets the second resolution, but not limited thereto.

In some examples, the display component 53 includes:

a second communication module 531 configured to receive the real-time image and send the position information of region of interest;

a display device 532 configured to display the real-time image; and an eyeball tracking device configured to track ROI of a user's eyeballs on the two-dimensional pixel array 521 of the bionic vision sensor and generate position information of region of interest, but not limited thereto.

In some examples, the display component is set on one of the following devices:

a smart helmet with eye-tracking capabilities;
a smart glasses with eye-tracking capabilities;
a mobile phone with eye tracking function; or
a display with eye-tracking capabilities, but not limited thereto.

Figure 11:
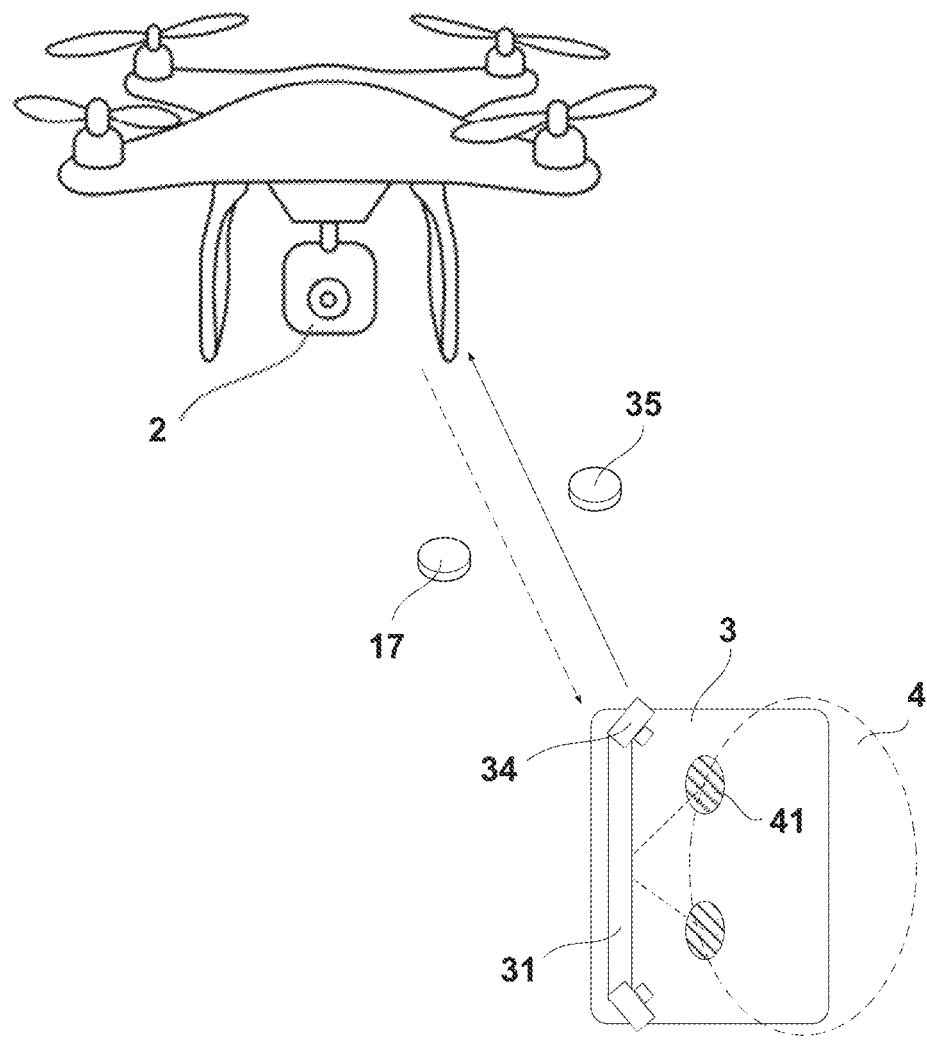
FIG. 11 is a schematic diagram of a scenario of a UAV image transmission system according in operating to an embodiment of the present disclosure.
Figure 12:
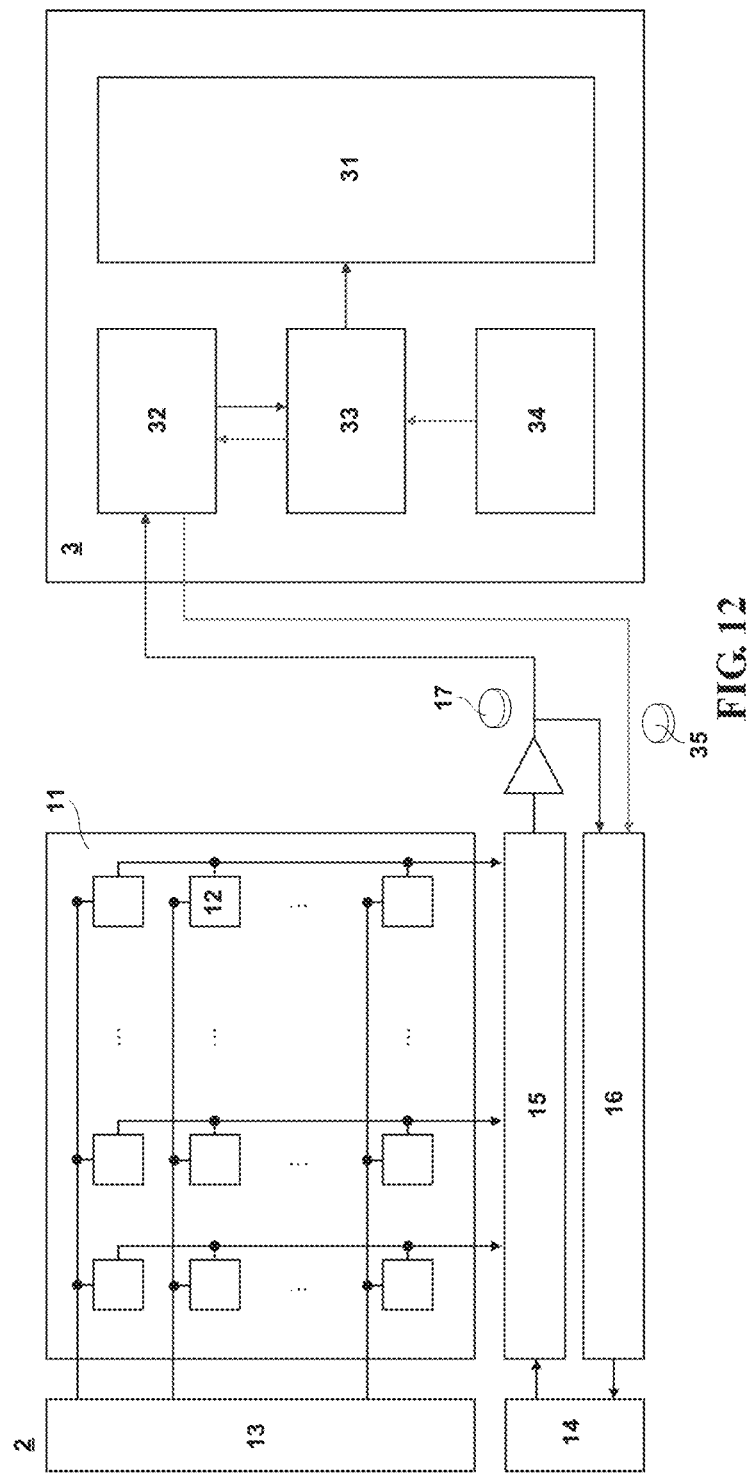
FIG. 12 is a circuit module diagram of a UAV image transmission system according in operating to an embodiment of the present disclosure.

FIG. 11 is a schematic diagram of a scenario of a UAV image transmission system, and FIG. 12 is a diagram of a circuit module that operates the UAV image transmission system according to an embodiment of the present disclosure. As shown in FIG. 11 and FIG. 12, the bionic vision sensor 2 of the present disclosure is set in the camera of the UAV, and the display component 3 is set in a smart helmet with eye tracking function. The difference between this embodiment and the embodiment in FIG. 2 is that the captured real-time image 17 is displayed by the smart helmet with eye tracking function, and the ROI of the user's eyes based on the image is tracked to obtain the ROI position information 35, and the ROI position information 35 is sent to the UAV.

The image sensor 2 also includes: a pixel array 11, a row control circuit 13, a system control unit 14, an ADC array 15 and an ROI determination unit 16. The pixel array 11 includes a plurality of sensor pixels 12. Each pixel arranged in a two-dimensional row-column distribution in the pixel array 11 completes photoelectric conversion in time sequence, and outputs an electrical signal to an analog-to-digital converter (ADC) 12 in the corresponding column. The ROI determination unit 16 is configured to determine the ROI according to the received image data, and dynamically adjust and output the corresponding control signal. The ROI determination unit 16 obtains position information of at least one region of interest based on the pixel array 11. The system control unit 14 may control a certain ADC in the ADC array 15 on or off. The system control unit 14 obtains at least one first region and at least one second region outside the first region in the pixel array 11 according to position information of at least one region of interest.

The ADC array 15 is configured to receive the analog signal of a certain pixel in the corresponding column, and the analog signal is used for completing the exposure sequence by the row control circuit. The ADC array 15 is also configured to convert the analog signal into a digital signal for output. The ADC array 15 generates a real-time image 17 based on image data respectively obtained in the first region and in the second region, the pixel sampling rate of the first region is greater than that of the second region. The ROI determination unit 16 determines the ROI according to the received ROI position information 35 sent by the smart helmet, and dynamically adjusts and outputs the corresponding control signal, which will not be repeated here.

The display component displays the real-time image received by the second communication module 531 through the display screen 31, and the eye tracker 34 tracks the of the user's eyeballs in the two-dimensional pixel array 521, the ROI position information 35 is generated and transmitted to the UAV through the second communication module 531.

The regional image are sampled according to ROI position information and a real-time image is generated, wherein a resolution of an image region around the ROI position information in the real-time image is greater than a resolution of other image region. The display component 53 receives and displays the real-time image, and tracks the RIO of the user's eyeballs in the two-dimensional pixel array 521 in the bionic vision sensor 52 to generate RIO position information, but not limited thereto.

In summary, the present disclosure provides a bionic vision sensor, an imaging method and a UAV image transmission system, which can generate real-time images through partition sampling with adjustable resolution, retain the high resolution of ROI while reduce the resolution of the peripheral region, thereby improving the quality of image transmission and enhancing the safety of navigation operations without increasing bandwidth and power consumption.

What is claimed is:

1. A bionic vision sensor comprising:
a two-dimensional pixel array comprising a plurality of sensor pixels;
a ROI module, wherein the ROI module is configured to obtain position information of at least one region of interest based on the two-dimensional pixel array;
an image segmentation module, wherein the image segmentation module is configured to obtain at least one first region of the two-dimensional pixel array and at least one second region outside the first region according to the position information of region of interest; and
a regional imaging control module, wherein the regional imaging control module is configured to generate a real-time image based on image data respectively obtained in the first region and the second region, and a pixel sampling rate of the first region is greater than a pixel sampling rate of the second region;
wherein the two-dimensional pixel array further comprises a sampling array;
wherein the sampling array comprises a plurality of transmission channels that are capable of connecting or disconnecting to each sensor pixel respectively;
the sampling array is configured to update a status of the transmission channels in a first sampling sub-array in a first region according to the first resolution, and make a number of transmission channels in the first sampling sub-array meet the first resolution; and the sampling array is configured to update a status of the transmission channels in a second sampling sub-array in a second region according to the second resolution, and make a number of transmission channels in the second sampling sub-array meet the second resolution.

2. The bionic vision sensor according to claim 1, wherein the ROI module comprises a prediction neural network module, and a real-time image is input into the prediction neural network module to obtain position information of at least one region of interest.

3. The bionic vision sensor according to claim 2, wherein the two-dimensional pixel array is configured to obtain a preliminary image at a pixel sampling rate of a preset resolution for each frame, and inputs the preliminary image into a prediction neural network module to obtain position information of at least one region of interest in a current frame; and the regional imaging control module is configured to generate a real-time image based on image data respectively obtained in the first region and in the second region, the first region is imaged at a highest resolution, and the second region is imaged at a reduced pixel sampling rate.

4. The bionic vision sensor according to claim 2, wherein the two-dimensional pixel array is configured to obtain a preliminary image at a pixel sampling rate of a lowest resolution for each frame, and inputs the preliminary image into a prediction neural network module to obtain position information of at least one region of interest in a current frame; and the regional imaging control module is configured to generate a real-time image based on image data respectively obtained in the first region and in the second region, the first region is imaged at a highest resolution, and the second region is imaged at a reduced pixel sampling rate.

5. The bionic vision sensor according to claim 2, wherein a real-time image of a current frame is input into the prediction neural network module to obtain position information of one region of interest of a next frame.

6. The bionic vision sensor according to claim 1, wherein the regional imaging control module is configured to select a first sensor pixel group from the first region according to a first resolution, and select a second sensor pixel group from the second region according to a second resolution, wherein the first resolution is higher than the second resolution; and the sampling array is configured to generate an image according to image data of a target scene collected by the first sensor pixel group and the second sensor pixel group.

7. The bionic vision sensor according to claim 1, wherein the ROI module receives position information of a ROI of a user's eyeballs on the two-dimensional pixel array generated by an eye tracking device.

8. An unmanned aerial vehicles (UAV) image transmission system comprising:

a bionic vision sensor arranged on a UAV and configured to sample images by partition according to position information of regions of interest and generate real-time images, wherein a resolution of an image region around the position information of region of interest in the real-time image is greater than a resolution of another image region; and a display component configured to receive and display the real-time image, track ROI of a user's eyeballs on the two-dimensional pixel array of the bionic vision sensor and generate position information of region of interest;

wherein the bionic vision sensor comprises:

a two-dimensional pixel array comprising a plurality of sensor pixels;

a first communication module configured to receive the position information of region of interest and send a real-time image;

an image segmentation module, wherein the image segmentation module is configured to obtain at least one first region of the two-dimensional pixel array and at least one second region outside the first region according to the position information of region of interest; and a regional imaging control module, wherein the regional imaging control module is configured to generate a real-time image according to image data obtained respectively from the first region and the second region, and a pixel sampling rate of the first region is greater than a pixel sampling rate of the second region;

wherein the two-dimensional pixel array further comprises a sampling array;

wherein the sampling array comprises a plurality of transmission channels that are capable of connecting or disconnecting to each sensor pixel respectively;

the sampling array is configured to update a status of the transmission channels in a first sampling sub-array in a first region according to the first resolution, so that a number of transmission channels in the first sampling sub-array meets the first resolution;

the sampling array is configured to update a status of the transmission channels in a second sampling sub-array in a second region according to the second resolution, so that a number of transmission channels enabled in the second sampling sub-array meets the second resolution.

9. The UAV image transmission system according to claim 8, the regional imaging control module is configured to select a first sensor pixel group from the first region according to a first resolution, and select a second sensor pixel group from the second region according to a second resolution, wherein the first resolution is higher than the second resolution; and the sampling array is configured to generate an image according to the image data of a target scene collected by the first sensor pixel group and the second sensor pixel group.

10. The UAV image transmission system according to claim 8, wherein the display component is set on one of the following devices:

a smart helmet with eye-tracking capabilities;
a smart glasses with eye-tracking capabilities;
a mobile phone with eye tracking function; or
a display with eye-tracking capabilities.

* * * * *